United States Patent [19]
Kreitman et al.

[11] Patent Number: 5,956,000
[45] Date of Patent: Sep. 21, 1999

[54] DIGITAL IMAGE DISPLAY SYSTEM AND METHOD

[75] Inventors: Haim Kreitman, Kfar Saba; Mattetyahu Jonathan Litvak, Tel Aviv; Jonathan Cohen, Givatayim; Josef Ronen, Herzlia, all of Israel

[73] Assignee: Scitex Corporation Ltd., Herzlia, Israel

[21] Appl. No.: 08/854,578

[22] Filed: May 12, 1997

[51] Int. Cl.$^6$ ...................................................... H04N 5/74
[52] U.S. Cl. ................... 345/1; 345/40; 345/63; 345/113; 345/903; 348/383
[58] Field of Search .............................. 345/1, 4, 40, 42, 345/63, 113, 903, 118, 121, 126, 130; 348/383, 744, 745, 746, 747, 750, 751, 756; 353/34; 359/197, 204, 618

[56] References Cited

U.S. PATENT DOCUMENTS

| | | |
|---|---|---|
| 4,687,973 | 8/1987 | Holmes et al. . |
| 4,734,779 | 3/1988 | Levis et al. . |
| 4,974,073 | 11/1990 | Inova ........................................... 348/38 |
| 5,136,390 | 8/1992 | Inova et al. ............................... 348/383 |
| 5,175,575 | 12/1992 | Gersuk ........................................ 353/94 |
| 5,179,440 | 1/1993 | Loban et al. ............................. 348/383 |
| 5,260,797 | 11/1993 | Muraji et al. ............................ 348/745 |
| 5,475,447 | 12/1995 | Funado ..................................... 348/745 |
| 5,576,725 | 11/1996 | Shimada . |
| 5,764,228 | 6/1998 | Baldwin ................................... 345/344 |
| 5,771,072 | 6/1998 | Tokoro et al. ........................... 348/383 |
| 5,805,868 | 9/1998 | Murphy ..................................... 345/502 |

OTHER PUBLICATIONS

Holmes, R., SPIE, Projection Display Technology, Systems and Applications, vol. 1081, 1989.

NTT Corp. of Japan, Liquid Crystal Project, Japan Hi–Tech Report.

*Primary Examiner*—Mark R. Powell
*Assistant Examiner*—Vincent E. Kovalick
*Attorney, Agent, or Firm*—Darby & Darby

[57] ABSTRACT

A digital image display system and method for displaying a digital image in a large format are provided. The system includes a frame buffer for storing the digital image, which is projected via a plurality N of projection units. Each projection unit projects a section of the digital image which is 1/Nth of the digital image plus an overlap portion of each of its neighboring sections. Thus, when the sections are projected, the portions of the image corresponding to the edges between projection units will be overlapped. The intensities of the overlapped portions are typically modulated to ensure that, in the large format image, the overlapped portions receive the same amount of illumination as the non-overlapped portions. The resultant image will have no seams between projection units. The projection units are assumed to be mis-aligned and the misalignment is compensated for by transforming each section of the image in accordance with the misalignment of the projection.

26 Claims, 10 Drawing Sheets

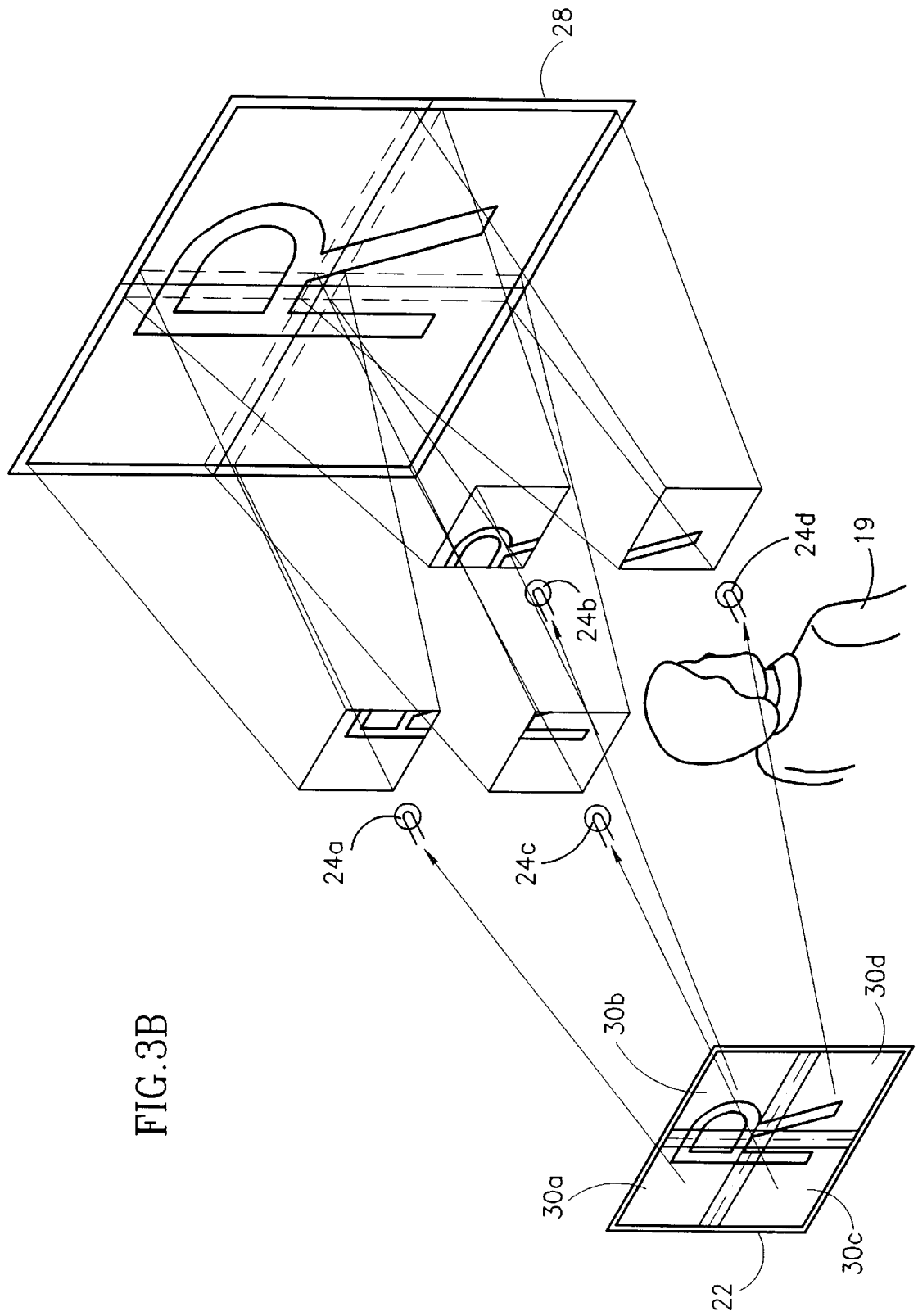

DIGITAL IMAGE DISPLAY SYSTEM AND METHOD

FIELD OF THE INVENTION

The present invention relates to large format display systems for displaying an image on a large surface.

BACKGROUND OF THE INVENTION

Computer systems typically display a digital image stored therein on their cathode ray tube (CRT) or liquid crystal display monitors. The image is typically displayed so as to fill most, if not all, of the monitor surface. The computer user can then view the image.

Unfortunately, computer monitors are typically quite small such that only one or two people can view the image displayed thereon. Therefore, it is known to project a digital image stored in a computer onto a large display. However, such a projection is of low resolution since each pixel on the computer monitor is translated into a single, large pixel of the large display.

Alternatively and as shown in FIG. 1 to which reference is now made, the digital image 10 can be displayed onto a "video wall" 12 formed of many monitors 14 next to each other in a matrix. Each monitor 14 of the video wall 12 receives only a section 16 of the image to be displayed. Thus, section 16a is projected onto monitor 14a, section 16b is projected onto monitor 14b, etc. The resultant large image is of approximately the same resolution as the stored image 10. However, since the large image is displayed on separate monitors 14, there are seams 18 in the large image viewed by the viewer 19.

NTT Corporation of Japan reported, in the Japan Hi-Tech Report, a large format, liquid crystal projector which utilizes four LCD basic projection units, each projecting one-quarter of the image to be displayed. The large format projector includes liquid prisms for superimposing the sub-images and controlling their exact locations on the display surface. Such a system has no seams 18 but has mechanical problems due to the need to align four basic projection units. The projection units can become mis-aligned over time due to thermal expansion or contraction of optical elements or due to wear and tear of mechanical alignment elements. This misalignment of the projection units will cause the large format image to become skewed.

Black Box Vision has produced a hoarding display system which has a series of LCD "bricks" which can be pieced together into screens. As described with respect to FIG. 1, there are seams between the bricks.

SUMMARY OF THE INVENTION

It is therefore an object of the present invention to provide a system for projecting large format images which overcomes the disadvantages of the prior art.

It is also an object of the present invention to provide a system for projecting large format images at a relatively high resolution.

The present invention projects the digital image via a plurality N of projection units. Each projection unit projects a section of the digital image which is 1/Nth of the digital image plus an overlap portion of each of its neighboring sections. Thus, when the sections are projected, the portions of the image corresponding to the edges between projection units will be overlapped. The intensities of the overlapped portions are typically modulated to ensure that, in the large format image, the overlapped portions receive the same amount of illumination as the non-overlapped portions. The resultant image will have no seams between projection units.

Additionally, the present invention assumes that the projection units are mis-aligned and compensates for the misalignment by transforming each section of the image in accordance with the misalignment of the projection unit which will project it. The present invention first measures the misalignments, in a calibration operation, and then utilizes the misalignment measurements to determine the transformations for each section of the image.

Since the present invention compensates for the misalignment by affecting the image to be projected, the present invention does not require expensive projection units nor an expensive housing to hold the projection units in exact alignment nor an expensive mechanical calibration operation, as are required by the prior art.

The calibration unit includes a pattern generator, an input device, a distortion determiner and a transformation generator. The pattern generator generates patterns on the projection screen within the overlap portions via the border and projection units. The input device enables an operator to provide distortion indications to the pattern generator which cause the patterns to become aligned in some desired way. The distortion determiner determines an extent of distortion indicated by the input device and provides such information to the pattern generator to generate distorted patterns. The transformation generator generates transformations to be utilized by the transformer in accordance with the extent of distortion as produced by the determiner, once the operator indicates that the patterns are aligned in a final desired way.

In one embodiment, the patterns are lines within the overlap portions. In another embodiment, they are colored patterns. In a third embodiment, the patterns are dotted, dashed or shaped patterns.

Furthermore, in accordance with a preferred embodiment of the present invention, the border units operate on corresponding border portions of the digital image.

Finally, in accordance with a preferred embodiment of the present invention, a method for displaying a digital image in a large format is also provided. The method includes the steps of:

a. dividing the digital image into N sections which have a size which is 1/N the size of the digital image plus an overlap portion;

b. with projection units, one per section, projecting the processed N sections onto a large format projection screen; and c. prior to the step of projecting, separately processing each of the N sections at least to compensate for an operator determined amount of misalignment in its corresponding projection unit.

Furthermore, in accordance with a preferred embodiment of the present invention, the step of processing includes the step of separately compensating for increased intensity in each of the overlap portions.

Additionally, in accordance with a preferred embodiment of the present invention, the method further includes the step of measuring and calibrating the misalignment in order to determine the transformation corresponding to each projection unit. The step of measuring and calibrating comprises the steps of:

a. generating patterns on the projection screen within the overlap portions;

b. enabling an operator to provide distortion indications which cause the patterns to become aligned in some desired way;

c. determining an extent of distortion indicated by the input means;

d. providing the extent of distortion to the step of generating patterns generator to generate patterns distorted in the way indicated by the operator; and e. generating transformations in accordance with the extent of distortion once the operator indicates that the patterns are aligned in a final desired way.

BRIEF DESCRIPTION OF THE DRAWINGS

The present invention will be understood and appreciated more fully from the following detailed description taken in conjunction with the drawings in which:

FIGS. 3A and 3B are schematic illustrations of the projection of overlapped portions of a digital image, useful in understanding one aspect of the system of FIG. 2;

DETAILED DESCRIPTION OF THE PRESENT INVENTION

Figure 1:
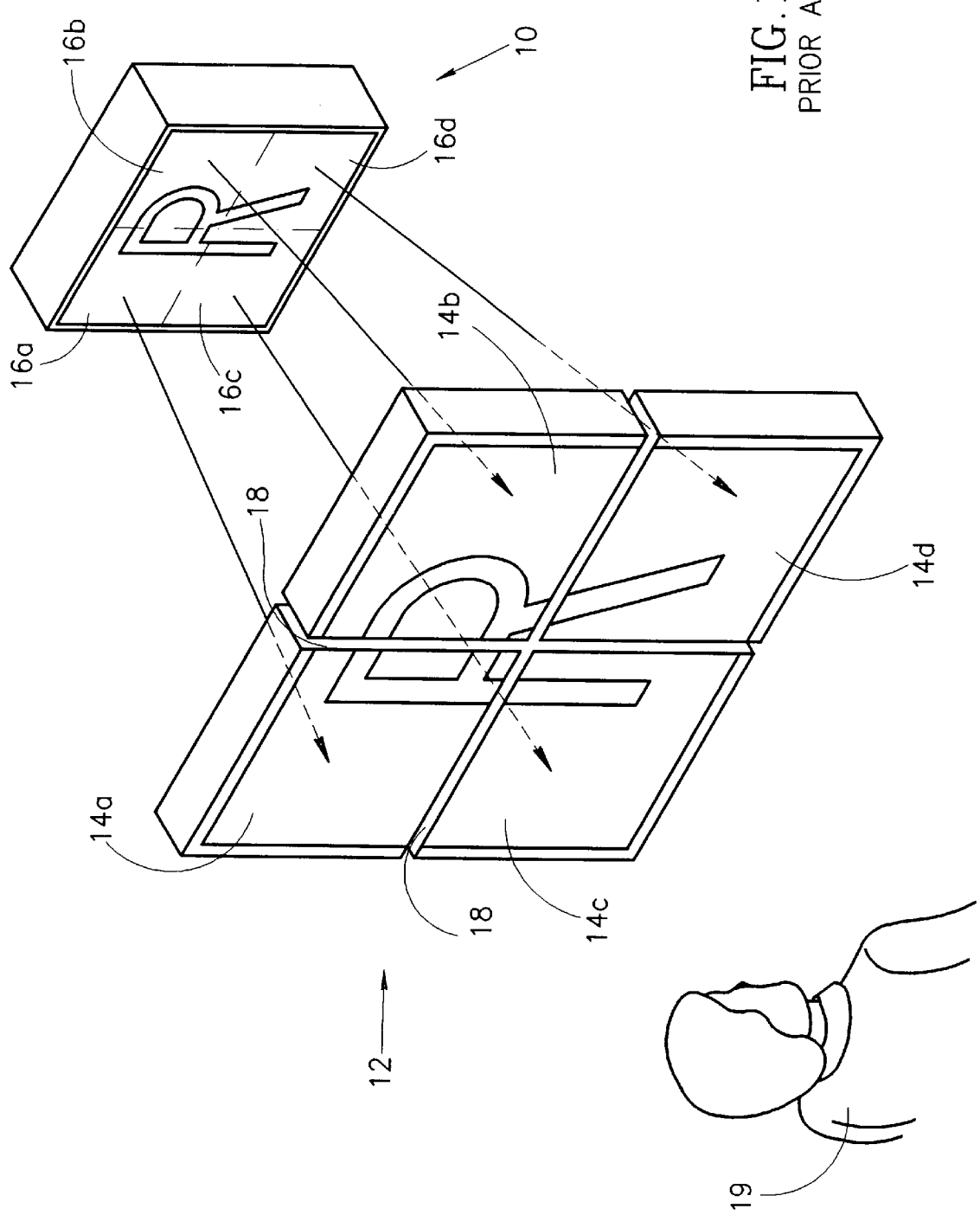
FIG. 1 is a schematic illustration of a prior art large format projection system.
Figure 2:
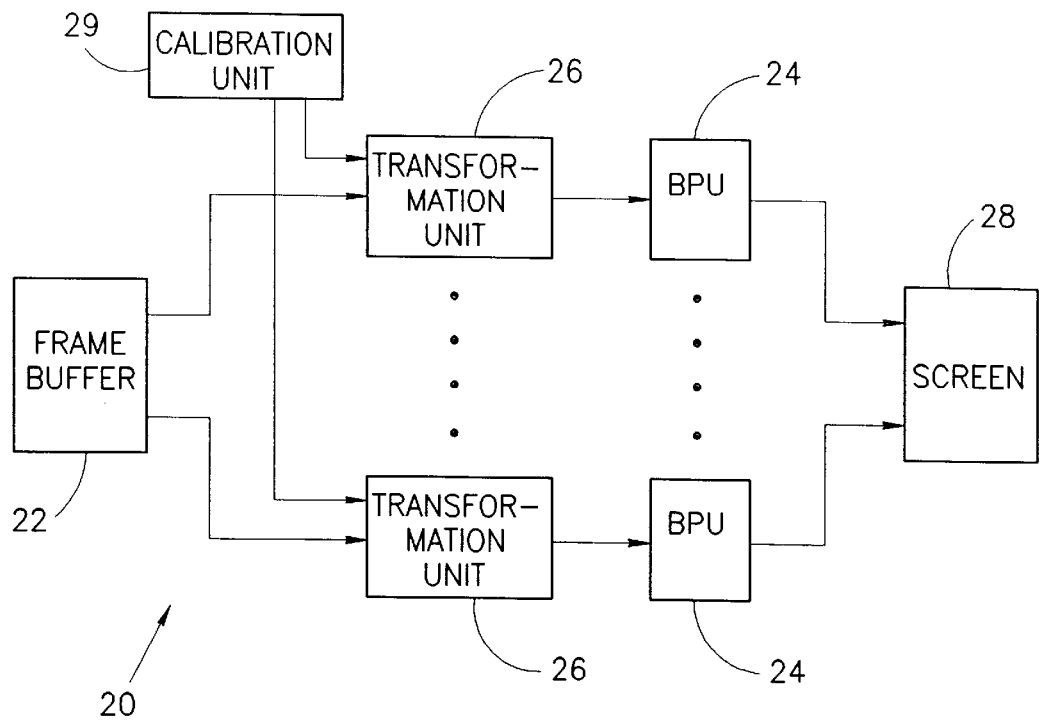
FIG. 2 is block diagram illustration of the large format projection system, constructed and operative in accordance with a preferred embodiment of the present projection units.

Reference is now made to FIG. 2 which illustrates a large format projection system 20, constructed and operative in accordance with a preferred embodiment of the present invention. The system 20 typically comprises a frame buffer 22, a plurality N of basic projection units (BPUs) 24, a corresponding plurality of transformation units 26, a large format projection screen 28 and a calibration unit 29. The system of the present invention is shown in FIGS. 2–5 as having four projection units 24, it being understood that the present invention is operative for any number, greater than 1, of projection units 24.

The frame buffer 22 stores a digital image to be projected, via BPUs 24, onto projection screen 28. In accordance with the present invention, the digital image of frame buffer 22 is divided into N sections, one per BPU 24. Each transformation unit 26 transforms the corresponding section in accordance with characteristics of the corresponding BPU 24. The corresponding BPU 24 then projects the transformed section onto projection screen 28. The BPUs 24 can be any suitable type of BPU 24, such as the NEC Electronic Workstation Projector, manufactured by NEC Corporation of Japan, the UNIC 1200P manufactured by Unic View of Israel, or the LitePro 550 projector, manufactured by InFocus Systems of Oregon, U.S.A.

Reference is now made to FIGS. 3A, 3B, 4, 5, 6 and 7 which detail the operation of the transformation units 26.

Figure 3A:
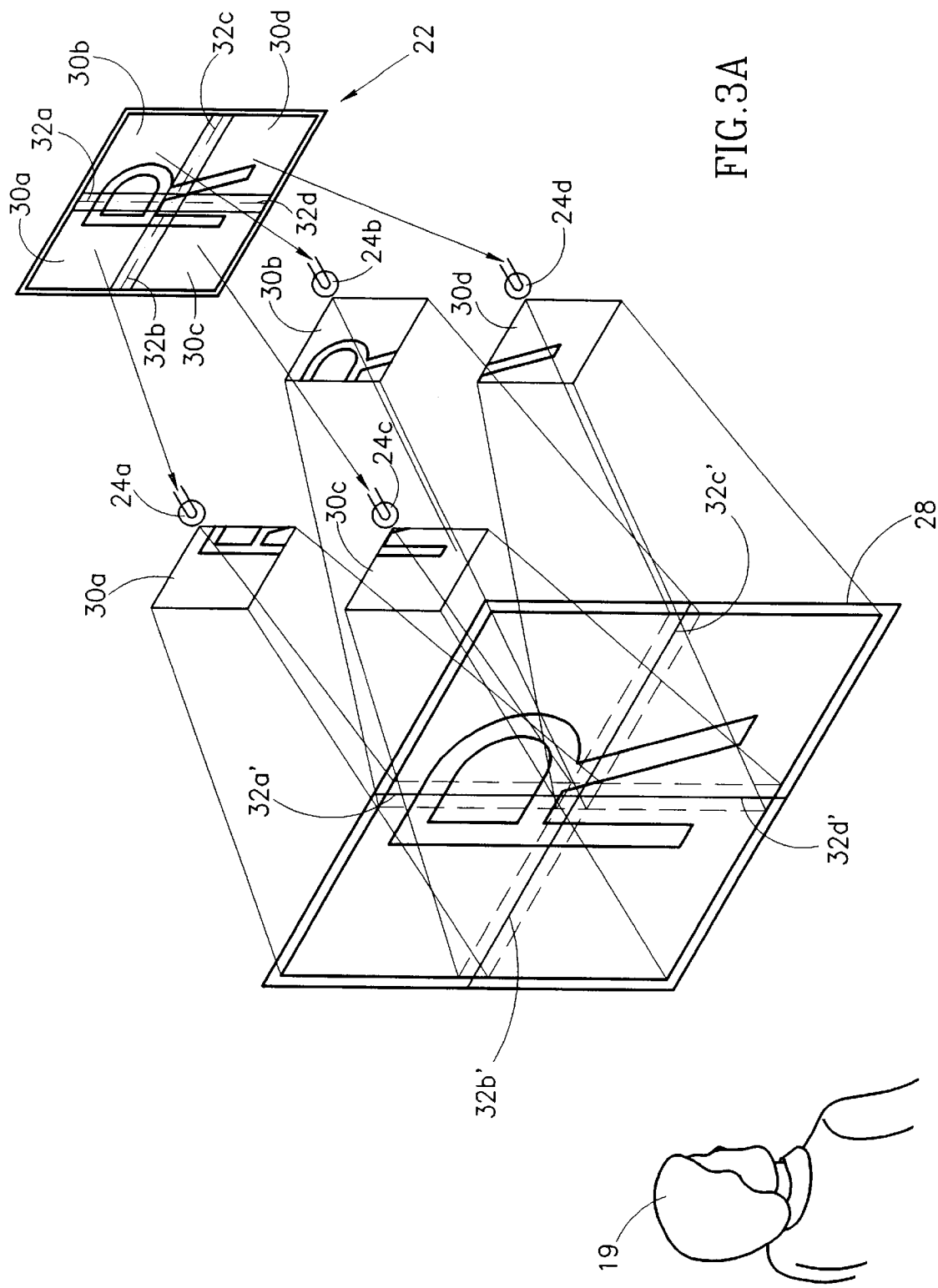

FIGS. 3A and 3B are similar with the exception that the viewer 19 views different sides of the projection screen 28. In FIG. 3A, the BPUs 24 are in front of the viewer 19 and project towards him and in FIG. 3B, the BPUs 24 are located behind the viewer 19 and project away from him. In FIGS. 3A and 3B, the BPUs 24 are shown schematically as illumination elements.

FIGS. 3A and 3B illustrate the sectioning of the frame buffer 22. Four sections are shown, which are denoted 30a, 30b, 30c and 30d. Section 30a is projected by BPU 24a, etc. In accordance with the present invention, each section 30 includes an overlap portion 32 from each of the neighboring sections 30. Thus, section 30a includes overlap portions 32a and 32b, section 30b includes overlap portions 32a and 32c, section 30c includes overlap portions 32b and 32d and section 30d includes overlap portions 32c and 32d. FIGS. 3A and 3B show the sections 30 illuminated by each BPU 24 and indicate the area of illumination of each BPU 24. Thus, FIGS. 3A and 3B show that the overlap portions 32a–32d have overlapping illumination, labeled 32a'–32d', on projection screen 28.

It will be appreciated that the overlapping illumination areas 32a'–32d' ensure that there are no gaps in the large format image viewed by viewer 19.

Since the overlapping illumination areas 32a'–32d' are illuminated by at least two BPUs 24, the transformation units 26 control the intensity of the BPUs 24 in the overlap portions to ensure that the amount of light received by the large format projection screen 28 is uniform throughout.

FIGS. 3A and 3B assume that the BPUs 24 are perfectly aligned or are at least aligned to the sensitivity of the eyes of the viewer 19. However, this is rarely the case and, if it is, the alignment is generally expensive to achieve since the viewer's eyes are quite sensitive to misalignments.

Figure 4:
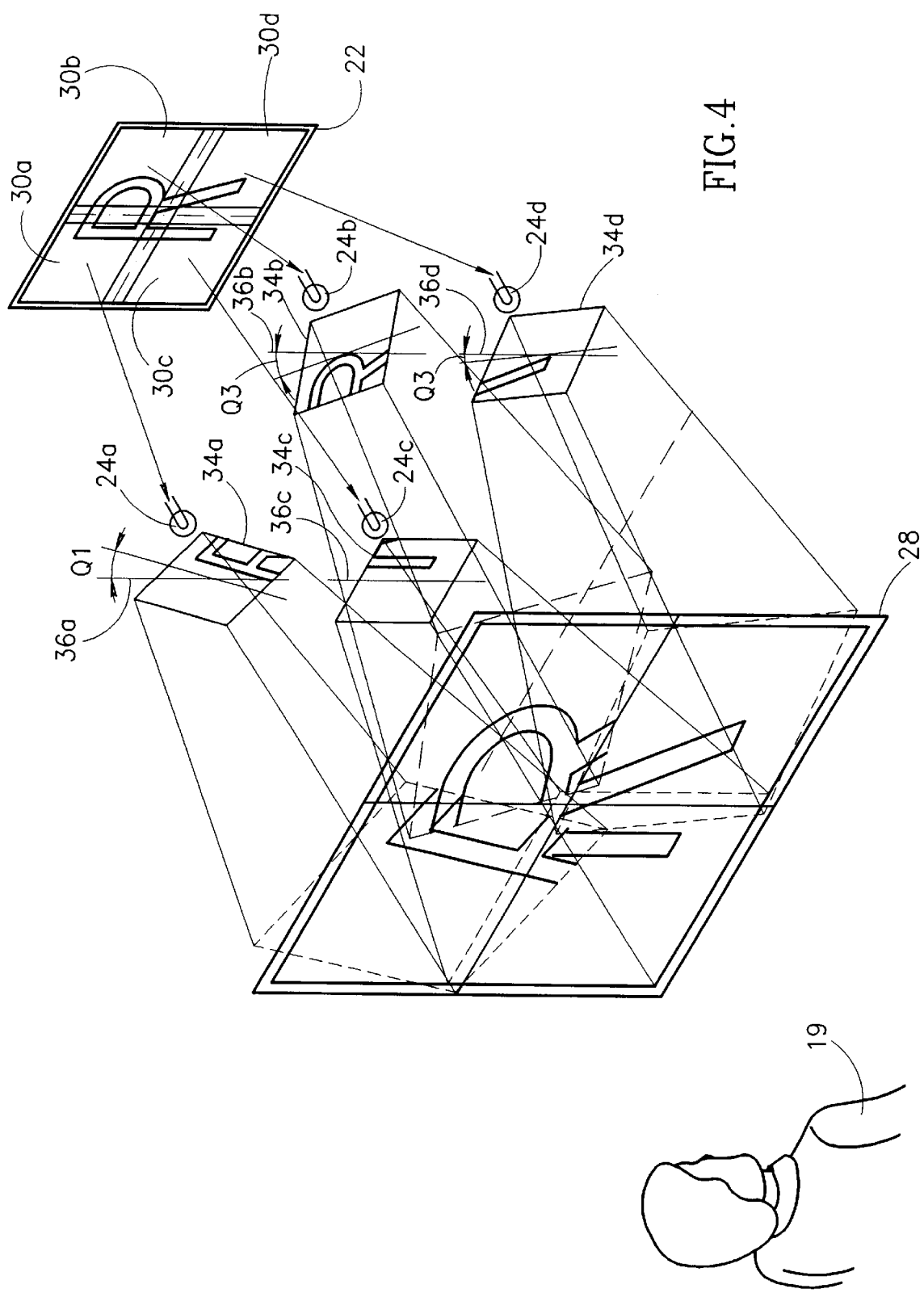
FIG. 4 is a schematic illustration of the system of FIG. 3A in the presence of mis-aligned projection units.

FIG. 4 illustrates the system of FIG. 3A when there are misalignments. For the purposes of illustration only, the misalignments are exaggerated. FIG. 4 illustrates the output of each BPU 24, labeled 34a–34d, and denotes an alignment axis (36a, 36b, 36c or 36d) for each. Since BPUs 24a, 24b and 24d are mis-aligned, their outputs 34a, 34b and 34d are rotated about their respective alignment axes (36a, 36b, 36c or 36d). The extent of rotation varies and is indicated by angles Q1, Q2 and Q3. The result of the misalignment is shown on the large format projection screen 28. The projected image is a collection of rotated sub-images and is not a large format projection of the image stored in frame buffer 22. It is noted that, although not shown, even a small misalignment can be detected by a viewer 19 and can cause the viewer 19 not to be satisfied with the system.

Figure 5:
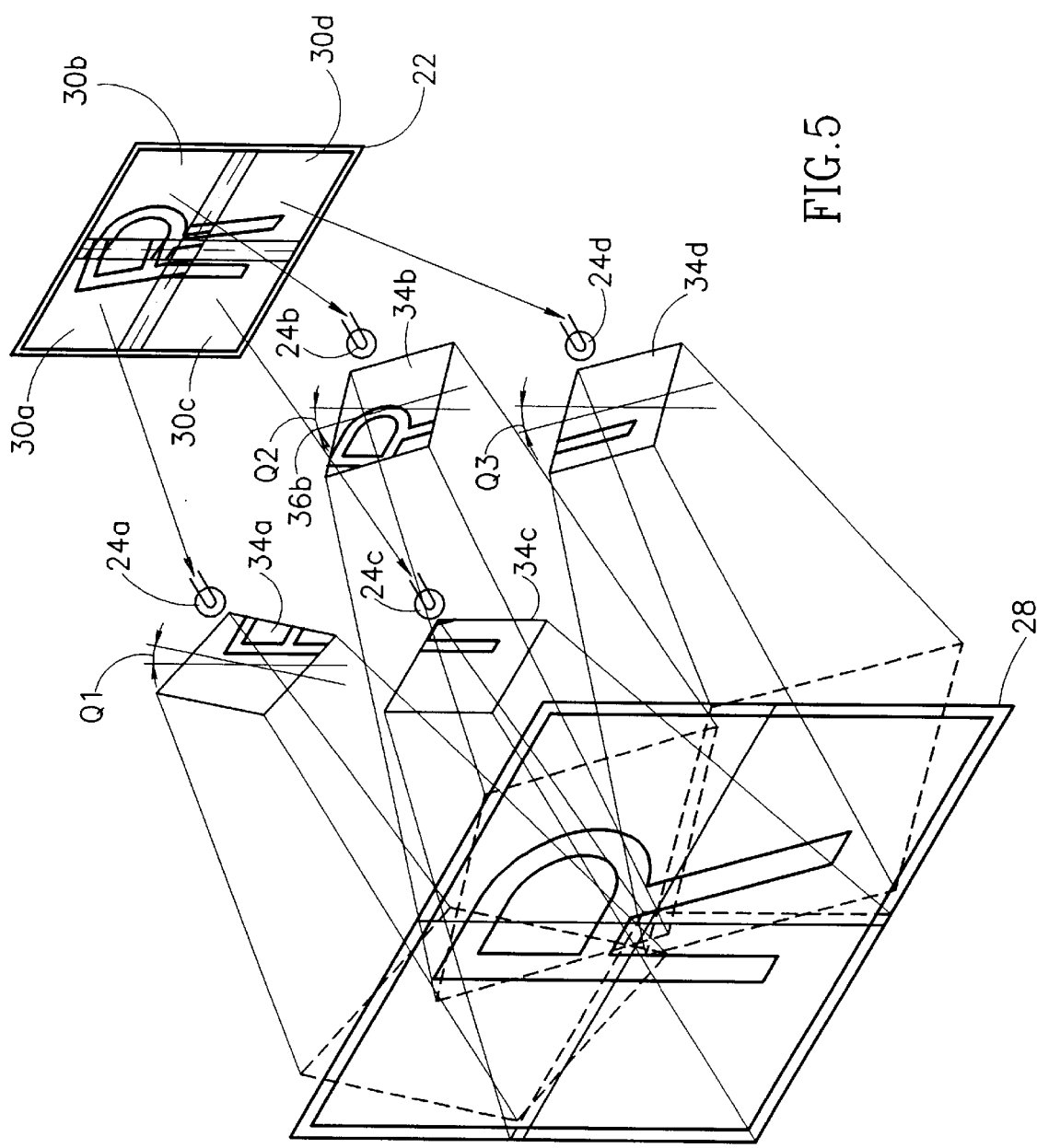
FIG. 5 is a schematic illustration of the compensation of the misalignments of the projection units, useful in understanding the system of FIG. 2.
Figure 5:
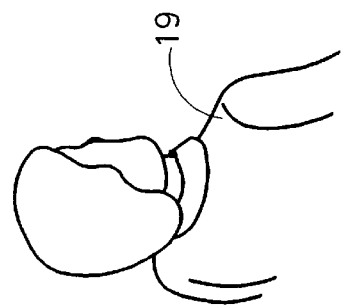

In accordance with the present invention, the misalignment is measured by calibration unit 29 and compensated by the transformation units 26. This is illustrated in FIG. 5. The BPUs 24 are still mis-aligned, as indicated by angles Q1–Q3; however, in FIG. 5, the transformation units 26 transform the data from the frame buffer 22 to compensate for the misalignment of the BPUs 24. FIG. 5 illustrates that the data from the frame buffer 22 is no longer an unrotated image; instead, sections 30a, 30b and 30d have been "back-rotated" in the directions reverse of angles Q1–Q3, respectively. Thus, when the back-rotated sections 30a, 30b and 30d are projected by the rotated BPUs 24a, 24b and 24d, respectively, the sections projected onto projection screen 28 will be aligned. FIG. 5 illustrates the large format projected image as being perfectly aligned.

Although not indicated in FIG. 5, frame buffer 22 always maintains the original image and transformation units 26 produce the appropriate compensated sub-images which the BPUs 24 are to project.

Figure 7:
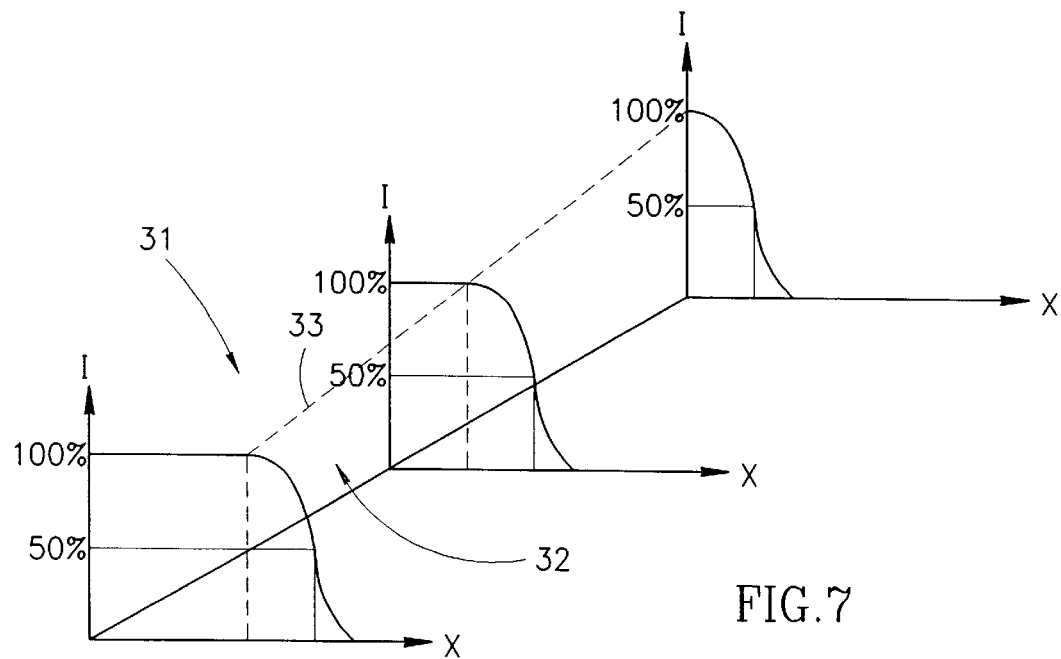
FIG. 7 is a schematic illustration of the operation of a border unit forming part of the system of FIG. 6.
Figure 6A:
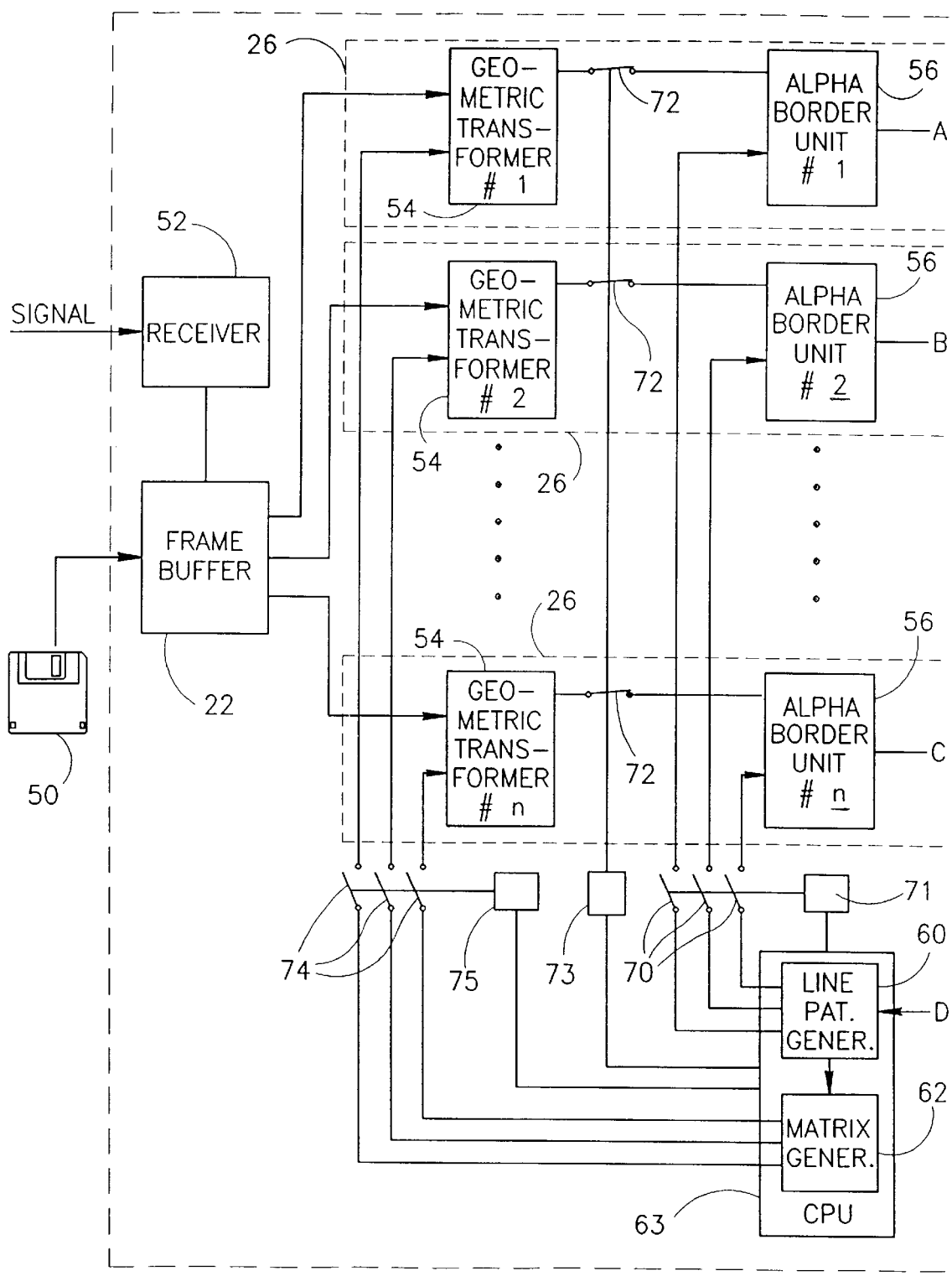
FIG. 6A/6B is a detailed illustration of the large format projection system of FIG. 2.
Figure 6B:
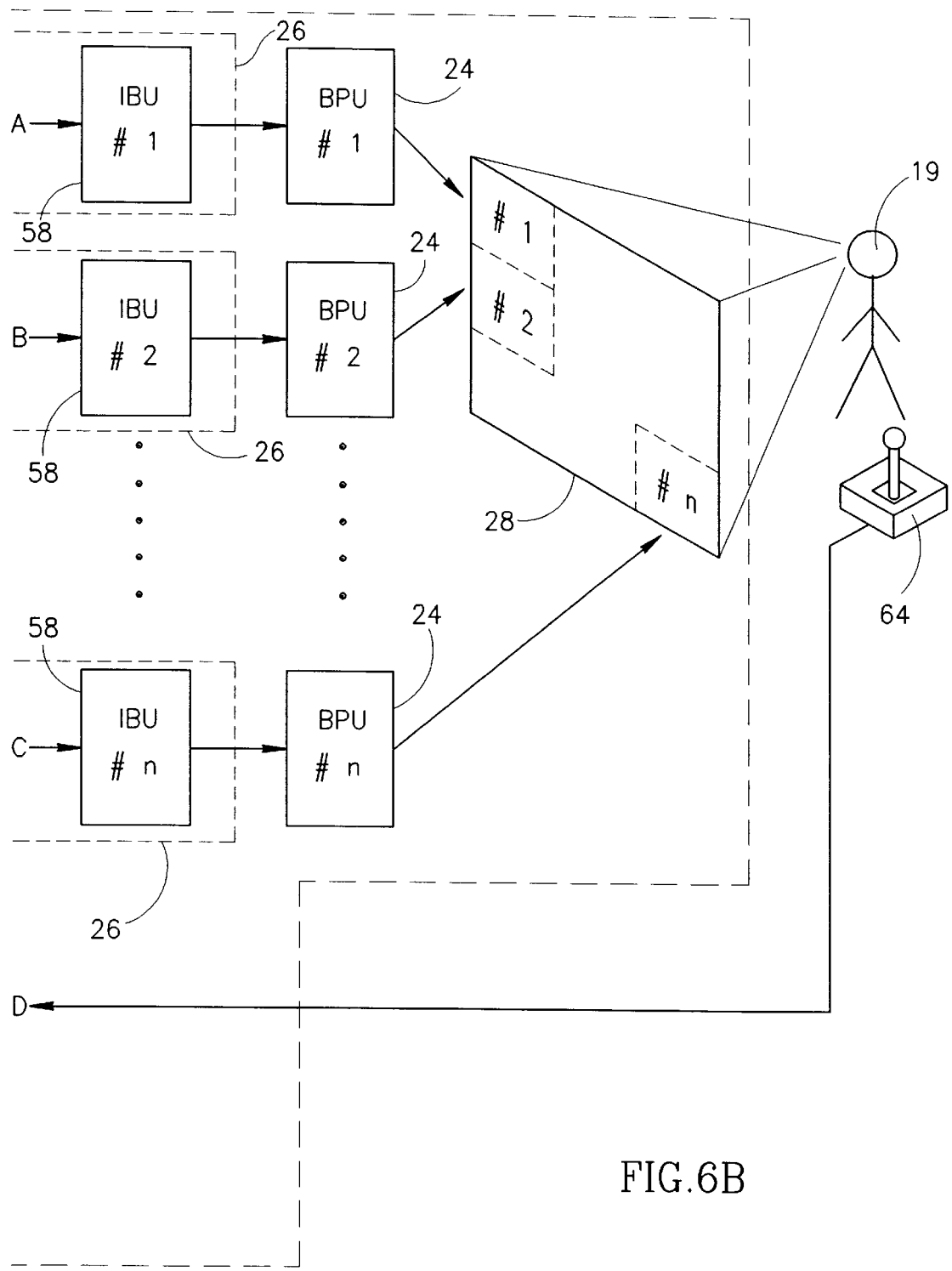
Figure 8:
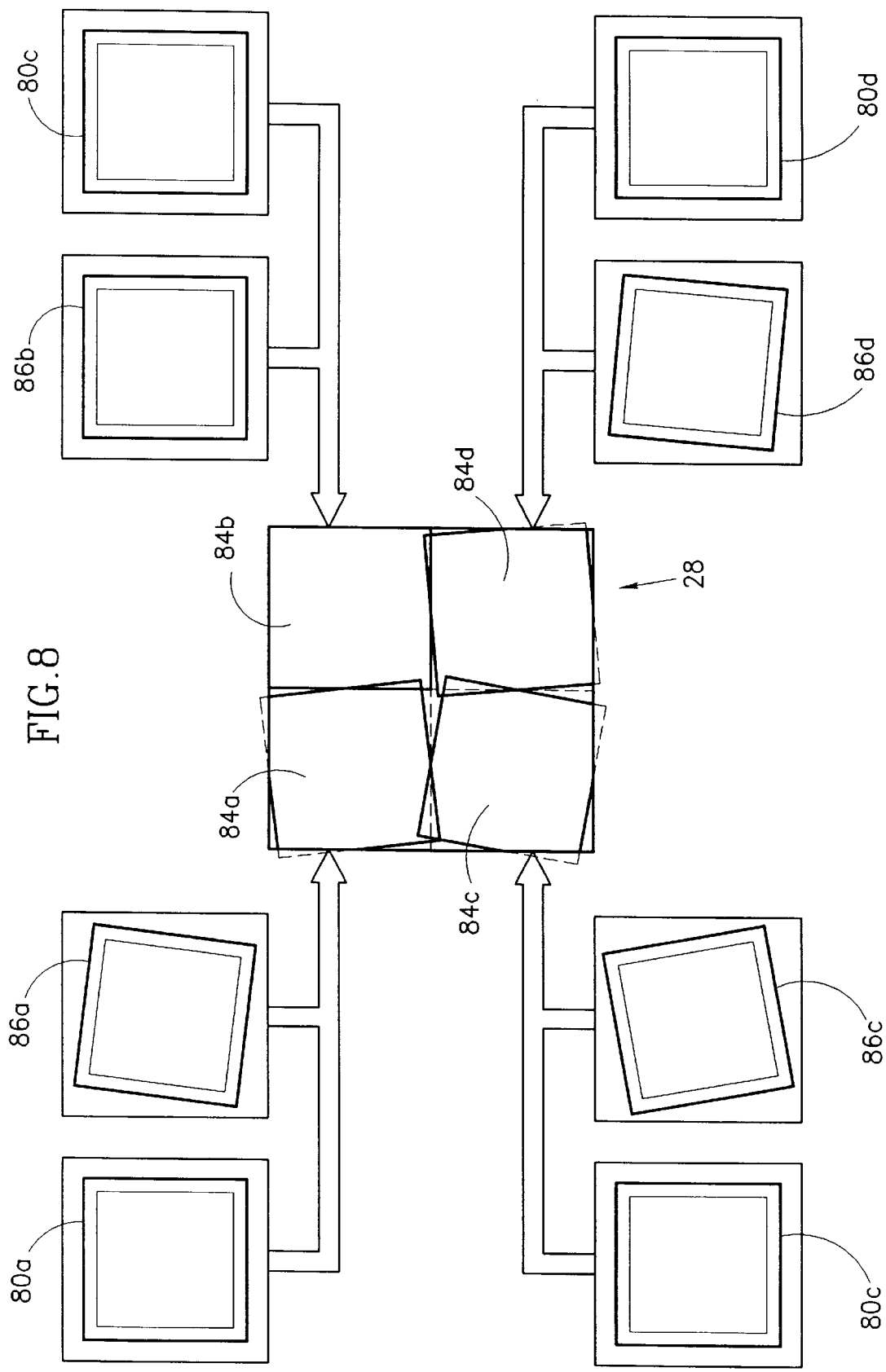
FIG. 8 is a schematic illustration of calibration lines, useful in understanding the calibration operation of the system of FIG. 6.

Reference is now made to FIG. 6A/6B which details the elements of the system of FIG. 2, to FIG. 7 which illustrates the operation of a border unit and to FIG. 8 which illustrates the calibration process performed by the system of FIG. 6.

The frame buffer 22 can receive the original image from many different sources, two of which are shown. The original image can be provided on a portable medium, such as a diskette 50 or a magnetic tape or on a compact-disk read only memory (CD-ROM), etc. Alternatively, the original image can be provided via a communications system, such as a data network, a wireless system or any other system. FIG. 6 illustrates a generic receiver 52 which receives the transmitted signal and converts it to an image frame. The image frame is then stored in frame buffer 22.

The transformation units 26 each comprise a geometric transformer 54, a border alpha unit 56 and an intermediate buffer (IBU) 58. Each geometric transformer 54 accesses its assigned section 30 (not shown) of frame buffer 22 and transforms the section according to a transformation matrix Mi stored within the relevant transformer 54. The transformation compensates for the rotation of the associated BPU 24, as discussed hereinabove. The generation of the transformation matrix Mi will be described in more detail hereinbelow.

Each border alpha unit 56 changes the intensity of the portions of the transformed sections 30 (produced by the corresponding geometric transformer 54) in the associated area of overlap 32. Typically, border alpha units 56 reduce the intensity to be projected towards the outer edges of the overlap area 32. FIG. 7, to which reference is now briefly made, illustrates the changing intensity in an example overlap area 32. Line 33 indicates the edge of the border, where the overlap area 32 is to its right and the non-overlap area, labeled 31, is to its left. Within the non-overlap area 31, the intensity remains at 100%. Within the overlap area 32, the intensity is gradually reduced to 0%.

The output of each alpha unit 56 is stored in its associated intermediate buffer 58. The associated basic projection unit (BPU) 24 then projects the data stored in its intermediate buffer 58 onto the projection screen 28 to be viewed by viewer 19.

The calibration unit 29 (FIG. 2, not specifically shown in FIGS. 6A/6B) generates the transformation matrix Mi with the help of viewer 19 and by using border alpha units 56, intermediate buffers (IBU) 58 and projection units 24. Calibration unit 29 additionally comprises a pattern generator 60, a matrix generator 62, and a joystick 64, or other input means. The pattern generator 60 can generate any desired pattern; shown herein is one example which generates line patterns.

When calibration is desired, CPU 63 connects the line pattern generator 60 directly to the border alpha units 56 and disconnects the alpha units 56 from the geometric transformers 54. The connections and disconnections are illustrated schematically by switches 70 and 72, respectively, which are centrally controlled by units 71 and 73, respectively. It will be understood that elements 70–73 can be physical or logical elements, as desired and are provided in FIG. 6 for the purposes of clarity only.

The line pattern generator 60 produces lines in the overlap areas 32, as shown in FIG. 8. The lines are produced by providing signals, to the border alpha units 56, whose intensities are high only in a small portion of the overlap area 32 which is controlled by the respective border alpha unit 66. The remaining overlap area has zero intensity and thus, nothing is displayed for those areas.

As shown in FIG. 8, the initial signals, labeled 80a, 80b, 80c and 80d, provide lines within the overlap areas 32 and have no misalignment correction therein. The resultant image which is projected onto projection screen 28, assuming that three of the BPUs 24 are mis-aligned, is illustrated in FIG. 8 with dark lines 84a, 84b, 84c and 84d. As can be seen, the dark lines 84a, 84c and 84d are not aligned with the sides of the projection screen 28 although dark lines 84b are.

In accordance with the present invention, the viewer 19 views the projection screen 28, with the mis-aligned lines 84, and indicates his corrections, for one of the mis-aligned lines 84 at a time, via the joystick 64. The viewer 19 controls the joystick 64 and the movement indications are provided to line pattern generator 60. In turn, the generator 60 moves the line pattern to be projected onto the screen 28. For example, line pattern 80a might be rotated to become line pattern 86a which, when projected onto screen 28 via the mis-aligned BPU 24a, becomes line pattern 86a, shown with dotted lines. Typically, when rotating the line pattern, line pattern generator 60 also rotates the associated border alpha unit to ensure that the overlap operation does not produce incorrect intensities. Translations can also be performed.

The viewer 19 controls the joystick 64 until the line patterns shown on screen 28 are aligned to his satisfaction. Typically, viewer 19 will separately align the output of each BPU 24. FIG. 8 illustrates four "rotated" line patterns 86a, 86b, 86c and 86d, where line pattern 86b is not rotated since projected line pattern 84b was perfectly aligned. The dotted lines of FIG. 8 illustrate the resultant, aligned patterns.

It will be appreciated that the line patterns produced by the line pattern generator can have any form. For example, they can be dotted or dashed lines and/or the lines 80 of each section of the image have different colors. Thus, when two lines overlap, the viewer will see a color change to the color which is the combination of the two colors.

Once the viewer 19 indicates to line pattern generator 60 that the calibration process is finished to his satisfaction, generator 60 provides four of equations of lines (one per line 86) to the matrix generator 62. The desired transformation matrix will be calculated from the four line equations.

The matrix generator 62 produces the transformation matrices Mi, as described in more detail hereinbelow, from the four line equations for each of the BPUs 24. Once the transformation matrices Mi are produced, switches 70 are opened, thereby disconnecting the line pattern generator 60, and switches 74, controlled by a unit 75, are closed, thereby to connect the matrix generator 62 to geometric transformers 54. The relevant transformation matrix Mi is then downloaded into its appropriate geometric transformer 54 and is also utilized to transform the corresponding border alpha unit 56. After downloading, switches 74 are opened and switches 72 are closed, thereby enabling the transformation units 26 to transform their associated sections of the original image stored in frame buffer 22.

Figure 9:
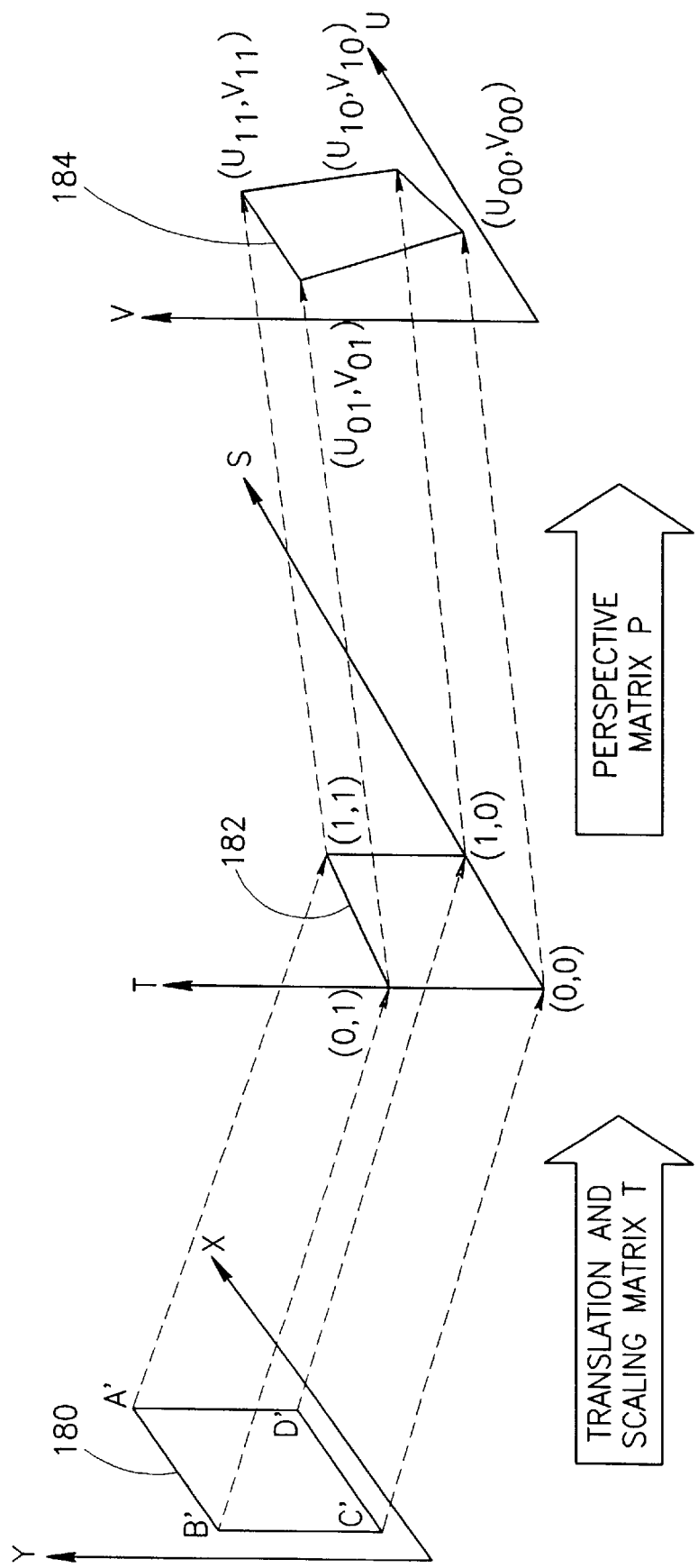
FIG. 9 is a schematic illustration describing how a transformation is produced, useful in understanding the operation of FIG. 6.

FIG. 9 is useful in understanding the operation of the matrix generator 62. For each section of the image, matrix generator 62 receives the parameters of the relevant lines 86 and converts them to the corresponding transformation matrix Mi. FIG. 9 shows three quadrilaterals 180, 182 and 184. Quadrilateral 180 is a quadrilateral ABCD' indicating the original lines 80 in an X-Y plane. Quadrilateral 182 is a unit square having points (0,1), (1,1), (0,0) and (1,0) in a TS plane. Quadrilateral 184 represents the final lines 86 after adjustment by the viewer 19 and is in a UV plane.

The transformation Mi from original quadrilateral 180 to moved quadrilateral 184 can be represented by the superposition of two transformations, a translation and scaling matrix T from quadrilateral 180 to the unit square 182 and a rotation matrix P from the unit square 182 to quadrilateral 184. Matrix T, in homogeneous coordinates, has the form:

Equation 1

$$T = \begin{matrix} Sx & 0 & 0 \\ 0 & Sy & 0 \\ Tx & Ty & 1 \end{matrix}$$

where Sx and Sy are the scaling factors in the X and Y directions, respectively and Tx and Ty are the X and Y translation factors. Sx, Sy, Tx and Ty are determined by the equation:

Equation 2

$$(x,y,1)*T=(s,t,1)$$

for the four coordinates (x,y,1) of quadrilateral 180 and the four coordinates (s,t,1) of unit square 182.

Matrix P, in homogeneous coordinates, has the form:

Equation 3

$$P = \begin{matrix} a11 & a12 & a13 \\ a21 & a22 & a23 \\ a31 & a32 & a33 \end{matrix}$$

The elements of the matrix P are determined by solving the following equation:

Equation 4

$$(s,t,1)*P=(u,v,w)$$

where (u, v, w) represents the four known coordinates of the points A, B, C and D of quadrilateral 184, as shown in FIG. 9, and w is always normalized.

Assume a33=1, then P can be calculated as follows:
From (s,t,1)=(0,0,1), we determine that:

Equation 5

$a31=U_{00}$ $a32=V_{00}$

From (s,t,1)=(1,0,1), we determine that:

Equation 6

$a11+a31=U_{10}(a13+1) \_ a11=U_{10}(a13+1)-U_{00}$ $a12+a32=V_{10}(a13+1) \_ a12=V_{10}(a13+1)-V_{10}$

From (s,t,1) (0,1,1) we determine that:

Equation 7

$a21+a31=U_{01}(a23+1) \_ a21=U_{01}(a23+1)-U_{00}$ $a22+a32=V_{01}(a23+1) \_ a22=V_{01}(a23+1)-V_{00}$

From (s,t,1)=(1,1,1) we determine that:

Equation 8

$a11+a21+a31=U_{11}(a13+a23+1)$ $a12+a22+a32=V_{11}(a13+a23+1)$

From equations 6–8, the following two equations in two unknowns, a13 and a23, are produced, as follows:

Equation 9

$a13(U_{10}-U_{11})+a23(U_{01}-U_{11})=U_{11}+U_{00}-U_{10}-U_{01}$ $a13(V_{10}-V_{11})+a23(V_{01}-V_{11})=V_{11}+V_{00}-V_{10}-V_{01}$

Once a13 and a23 are determined, the remaining elements can be determined from equations 6 and 7.

The mapping matrix Mi is the matrix product of matrices T and P, as follows:

Equation 10

$Mi=T*P$

Each transformation unit 26 then utilizes its transformation matrix Mi to transform its corresponding section. The calculations are as follows:

To produce a transformed point (u,v) from an untransformed point (x,y), the following operation occurs:

Equation 11

$$(u, v) = (x, y) * Mi = (x, y, 1) * \begin{matrix} b11 & b12 & b13 \\ b21 & b22 & b23 \\ b31 & b32 & b33 \end{matrix}$$

where b33 is always 1.

The matrix multiplication produces the following equations for u and v:

Equation 12

$$u = \frac{b11x + b21y + b31}{b13x + b23y + b33}$$

$$v = \frac{b12x + b22y + b32}{b13x + b23y + b33}$$

where b33 is always 1.

The matrix multiplication produces the following equations for u and v:

Equation 13

$$u = \frac{b11x + b21y + b31}{b13x + b23y + b33}$$

$$v = \frac{b12x + b22y + b32}{b13x + b23y + b33}$$

The computation of equation 12 above should be done at the rate of the incoming images, which is typically a video rate, such as 30 frames per seconds. For pictures of 1000 by 1000 pixels, this requires computation of approximately 30 million (u,v) values. If the requirement that all four corners of quadrilateral 180 match all four corners of quadrilateral 184 is relaxed, the computation of u and v is easier and less computation-intensive. For example, one of the corners of quadrilateral 180, such as the corner forming one of the outer corners of the entire image, does not have to match that of quadrilateral 184. The resultant equations for u and v typically have no denominator and thus, take much less time to compute.

It will be appreciated by persons skilled in the art that the present invention provides a system for projecting large format images onto a projection screen via a plurality N of projection units. Due to the overlap, the large format images do not have any seams between the projections of neighboring projection units 24 and, due to the calibration, there is no observable misalignment of the projection units 24. It will be appreciated that the calibration method of the present invention does not align the projection units 24 themselves, but aligns their output with the projection screen 28. As a result, the present invention does not require expensive alignment procedures.

It will further be appreciated that the present invention can be utilized to provide desired misalignments by which desired, and possibly artistic, images can be projected onto the projection screen.

It will be appreciated by persons skilled in the art that the present invention is not limited to what has been particularly shown and described hereinabove. Rather the scope of the present invention is defined by the claims which follow:

We claim:

1. A system for displaying a digital image in a large format and at a relatively high resolution, the system comprising:
   a. a frame buffer storing said digital image, said frame buffer being divided into N sections which have a size which is 1/N the size of said digital image plus an overlap portion;
   b. a large format projection screen;
   c. a plurality N of projection units for projecting said sections onto said projection screen;
   d. a plurality N of transformation units, one per projection unit, each transformation unit comprising:
      a border unit, operating on a corresponding one of said sections, for compensating for increased intensity in said overlap portions; and
      a transformer for transforming its corresponding section to compensate for misalignment in its corresponding projection unit; and
   f. a calibration unit for calibrating said transformer and said border unit.

2. A system according to claim 1 and wherein said calibration unit comprises:
   a. a pattern generator for generating patterns on said projection screen within said overlap portions via said border units and said projection units;
   b. input means for enabling an operator to provide distortion indications to said pattern generator which cause said patterns to become aligned in some desired way;
   c. a distortion determiner for determining an extent of distortion indicated by said input means and for providing such information to said pattern generator to generate distorted patterns; and
   d. a transformation generator for generating transformations to be utilized by said transformer in accordance with said extent of distortion as produced by said determiner, once said operator indicates that said patterns are aligned in a final desired way.

3. A system according to claim 2 and wherein said patterns are lines within the overlap portions.

4. A system according to claim 2 and wherein said patterns are colored patterns.

5. A system according to claim 2 and wherein said patterns are dotted, dashed or shaped patterns.

6. A system according to claim 1 and wherein said border units operate on corresponding border portions of said digital image.

7. A system for displaying a digital image in a large format, the system comprising:
   a. a frame buffer storing said digital image, said frame buffer being divided into N sections which are 1/N plus an overlap portion of the size of said digital image;
   b. a large format projection screen;
   c. a plurality N of projection units for projecting said sections onto said projection screen; and
   d. a plurality N of transformation units, one per projection unit, wherein each of said transformation units comprises a transformer for transforming its corresponding section to compensate for an operator determined amount of misalignment in its corresponding projection unit.

8. A system according to claim 7 and wherein each of said transformation units also comprises a border unit, operating on a corresponding one of said sections, for compensating for increased intensity in said overlap portions.

9. A system according to claim 9 and also comprising a calibration unit for calibrating said transformer and said border unit.

10. A system according to claim 9 and wherein said calibration unit comprises:
    a. a pattern generator for generating patterns on said projection screen within said overlap portions via said border units and said projection units;
    b. input means for enabling an operator to provide distortion indications to said pattern generator which cause said patterns to become aligned in some desired way;
    c. a distortion determiner for determining an extent of distortion indicated by said input means and for providing such information to said pattern generator to generate distorted patterns; and
    d. a transformation generator for generating transformations to be utilized by said transformer in accordance with said extent of distortion as produced by said determiner, once said operator indicates that said patterns are aligned in a final desired way.

11. A system according to claim 10 and wherein said patterns are lines within the overlap portions.

12. A system according to claim 10 and wherein said patterns are colored patterns.

13. A system according to claim 10 and wherein said patterns are dotted, dashed or shaped patterns.

14. A system according to claim 7 and wherein said border units operate on corresponding border portions of said digital image.

15. A method for displaying a digital image in a large format and at a relatively high resolution, the method comprising the steps of:
    a. dividing said digital image into N sections which have a size which is 1/N the size of said digital image plus an overlap portion; and b. seperately processing each of said N sections at least to compensate for increased intensity in each of said overlap portions, (said step of processing comprises the step of separately transforming each section to compensate for misalignment in its corresponding projection unit); and c. with projection units, one per section, protecting said processed N sections onto a large format projection screen;

wherein each step of processing comprises the step of separately transforming each section to compensate for misalignment in its corresponding projection unit; and also comprising the step of measuring and calibrating said misalignment in order to determine the transformation corresponding to each projection unit.

16. A method according to claim 15 and wherein said step of calibrating comprises the steps of:

a. generating patterns on said projection screen within said overlap portions;
   b. enabling an operator to provide distortion indications which cause said patterns to become aligned in some desired way;
   c. determining an extent of distortion indicated by said input means;
   d. providing said extent of distortion to said step of generating patterns generator to generate patterns distorted in the way indicated by said operator; and
   e. generating transformations in accordance with said extent of distortion once said operator indicates that said patterns are aligned in a final desired way.

17. A method according to claim 16 and wherein said patterns are lines within the overlap portions.

18. A method according to claim 16 and wherein said patterns are colored patterns.

19. A method according to claim 16 and wherein said patterns are dotted, dashed or shaped patterns.

20. A method for displaying a digital image in a large format, the method comprising the steps of:

a. dividing said digital image into N sections which have a size which is 1/N the size of said digital image plus an overlap portion;
   b. with projection units, one per section, projecting said processed N sections onto a large format projection screen; and
   c. prior to said step of projecting, separately processing each of said N sections at least to compensate for an operator determined amount of misalignment in its corresponding projection unit.

21. A method according to claim 20 wherein said step of processing comprises the step of separately compensating for increased intensity in each of said overlap portions.

22. A method according to claim 21 and also comprising the step of measuring and calibrating said misalignment in order to determine the transformation corresponding to each projection unit.

23. A method according to claim 22 and wherein said step of measuring and calibrating comprises the steps of:

a. generating patterns on said projection screen within said overlap portions;
   b. enabling an operator to provide distortion indications which cause said patterns to become aligned in some desired way;
   c. determining an extent of distortion indicated by said input means;
   d. providing said extent of distortion to said step of generating patterns generator to generate patterns distorted in the way indicated by said operator; and
   e. generating transformations in accordance with said extent of distortion once said operator indicates that said patterns are aligned in a final desired way.

24. A method according to claim 23 and wherein said patterns are lines within the overlap portions.

25. A method according to claim 23 and wherein said patterns are colored patterns.

26. A method according to claim 23 and wherein said patterns are dotted, dashed or shaped patterns.

* * * * *